United States Patent
Durand et al.

(10) Patent No.: US 11,875,483 B2
(45) Date of Patent: Jan. 16, 2024

(54) METHOD AND DEVICE FOR REMOVING REMANENCE IN AN INFRARED IMAGE OF A CHANGING SCENE

(71) Applicant: LYNRED, Palaiseau (FR)

(72) Inventors: Alain Durand, Voiron (FR); Olivier Harant, Saint-Jean-de-Moirans (FR)

(73) Assignee: LYNRED, Palaiseau (FR)

( * ) Notice: Subject to any disclaimer, the term of this patent is extended or adjusted under 35 U.S.C. 154(b) by 248 days.

(21) Appl. No.: 17/604,910

(22) PCT Filed: Apr. 28, 2020

(86) PCT No.: PCT/EP2020/061810
§ 371 (c)(1),
(2) Date: Oct. 19, 2021

(87) PCT Pub. No.: WO2020/221773
PCT Pub. Date: Nov. 5, 2020

(65) Prior Publication Data
US 2022/0198618 A1    Jun. 23, 2022

(30) Foreign Application Priority Data
Apr. 30, 2019   (FR) ..................................... 1904565

(51) Int. Cl.
*G06T 5/00*        (2006.01)
*H04N 23/80*       (2023.01)

(52) U.S. Cl.
CPC ............. *G06T 5/005* (2013.01); *H04N 23/80* (2023.01); *G06T 2207/10016* (2013.01); *G06T 2207/10048* (2013.01)

(58) Field of Classification Search
None
See application file for complete search history.

(56) References Cited

U.S. PATENT DOCUMENTS

| | | | |
|---|---|---|---|
| 2013/0218500 A1* | 8/2013 | Durand | G01J 5/22 702/87 |
| 2015/0003675 A1* | 1/2015 | Nakagami | G06V 20/52 382/103 |

(Continued)

FOREIGN PATENT DOCUMENTS

| | | |
|---|---|---|
| EP | 1727359 A2 | 11/2006 |
| EP | 2632150 A2 | 8/2013 |

OTHER PUBLICATIONS

International Search Report for PCT/EP2020/061810 dated Jul. 20, 2020.

(Continued)

*Primary Examiner* — Stefan Gadomski
(74) *Attorney, Agent, or Firm* — Perilla Knox & Hildebrandt LLP; Jason M. Perilla (57) ABSTRACT

The present disclosure relates to a method of removing, by an imaging processing device, remanence artifacts from an image ($f_n$) of a sequence of images captured by an infrared imaging device, the method comprising:
   inpainting a zone of remanence in the image ($f_n$) to generate an inpainted image;
   generating a remanence measure for at least some pixels in the image ($f_n$) based on the inpainted image; and
   removing remanence artifacts from at least some pixels of the image ($f_n$) based on a remanence estimation for each of the at least some pixels, each remanence estimation being generated based on the remanence measures of a plurality of the images in the sequence.

15 Claims, 7 Drawing Sheets

(56) References Cited

U.S. PATENT DOCUMENTS

| | | | | |
|---|---|---|---|---|
| 2015/0097944 A1* | 4/2015 | Palm | ............... | G01N 25/72 |
| | | | | 382/141 |
| 2016/0063310 A1* | 3/2016 | Okamoto | ............... | G06V 20/52 |
| | | | | 348/143 |
| 2018/0232861 A1* | 8/2018 | Hamauzu | ............... | G06T 5/002 |
| 2019/0020791 A1* | 1/2019 | Kuybeda | ............... | H04N 25/627 |
| 2019/0228506 A1* | 7/2019 | DeWeert | ............... | G06T 7/13 |

OTHER PUBLICATIONS

Rong-Chi Chang et al: "Photo Defect Detection for Image Inpainting", Multimedia, Seventh IEEE International Symposium On Irvine, CA, USA Dec. 12-14, 2005, Piscataway, NJ, USA,IEEE, Dec. 12, 2005 (Dec. 12, 2005), pp. 403-407, XP010870562,DOI: 10.1109/ISM.2005.91ISBN: 978-0-7695-2489-4 le document en entier.

Mou Xin-Gang et al: "Nonuniformity correction algorithm based on Gaussian mixture model", International Symposium On Photoelectronic Detection and Imaging 2011: Advances in Infrared Imaging and Applications, SPIE, 1000 20th St. Bellingham WA 98225-6705 USA, vol. 8193, No. 1, 25 aout 2011 (Aug. 25, 2011), pp. 1-8, XP060022078, DOI: 10.1117/12.900973 le document en entier.

International Search Report for PCT/EP2020/061811 dated Jul. 17, 2020.

Liu Chengwei et al.: "FPN estimation based nonuniformity correction for infrared imaging system", Infrared Physics and Technology, Elsevier Science, GB, vol. 96, Oct. 16, 2018 (Oct. 16, 2108), pp. 22-29, XP085577472, ISSN: 1350-4495, DOI: 10.1016/J.INFRARED. 2018.09.025 le document en entier.

* cited by examiner

METHOD AND DEVICE FOR REMOVING REMANENCE IN AN INFRARED IMAGE OF A CHANGING SCENE

The present patent application is a 35 U.S.C. § 371 National Stage Patent Application of Patent Cooperation Treaty Patent Application No. PCT/EP2020/061810, filed on Apr. 28, 2020, and titled "METHOD AND DEVICE FOR REMOVING REMANENCE IN AN INFRARED IMAGE OF A CHANGING SCENE," which claims priority to from the French patent application no. FR1904565, filed Apr. 20, 2019, the entire contents of both of which applications are hereby incorporated herein by reference.

TECHNICAL FIELD

The present disclosure relates generally to the field of infrared imaging, and in particular to a method and device for removing remanence from an infrared image.

BACKGROUND

Microbolometers are a type of uncooled infrared (IR) camera used to capture thermal images of an image scene. Such IR cameras generally comprise an arrangement of IR-sensitive detectors forming a pixel array. Each pixel of the pixel array converts a measured temperature at the pixel into a corresponding electrical signal, generally a voltage, which is in turn converted by an ADC (analog to digital converter) into a digital output signal.

Each pixel of a microbolometer comprises a membrane suspended over a substrate. The membrane comprises an absorption layer that absorbs energy from the IR light hitting the pixel, causing its temperature to rise as a function of the intensity of the IR light. The membrane for example also comprises a thermal layer, which has the property that its resistance is modified by this temperature rise, and the pixel can thus be read by detecting the change in resistance of this thermal layer, which is thermally linked to the absorption layer.

Uncooled IR sensors such as microbolometers can suffer from an imaging artifact known as remanence, which occurs when a high temperature flux is received by the pixel array. For example, such a high temperature flux could be caused by the sun or another intense heat source, and results in a modification of the resistivity of the concerned pixels. It takes time for the resistance of these pixels to return to a normal level after the pixel temperature has fallen, causing a degradation of the image quality that can last for a few minutes or up to a few days, depending on the flux level.

In the case of cameras having mechanical shutters, algorithms for removing remanence artifacts are relatively simple. However, there is a technical difficulty in removing remanence artifacts from images captured by uncooled shutterless IR sensors.

SUMMARY OF INVENTION

It is an aim of embodiments of the present disclosure to at least partially address one or more difficulties in the prior art.

According to one aspect, there is provided a method of removing, by an imaging processing device, remanence artifacts from an image of a sequence of images captured by an infrared imaging device, the method comprising: inpainting a zone of remanence in the image to generate an inpainted image; generating a remanence measure for at least some pixels in the image based on the inpainted image; and removing remanence artifacts from at least some pixels of the image based on a remanence estimation for each of the at least some pixels, each remanence estimation being generated based on the remanence measures of a plurality of the images in the sequence.

According to one embodiment, the remanence estimation is a mean remanence estimation. For example, the mean remanence estimation corresponds to an estimation of an instantaneous mean remanence for each of the at least some pixels.

According to one embodiment, generating the remanence measure for at least some pixels in the image comprises subtracting, from each pixel value of the at least some pixels of the image, a pixel value of a corresponding pixel in the inpainted image.

According to one embodiment, the method further comprises detecting the zone of remanence in the image.

According to one embodiment, the zone of remanence comprises less than 75% of pixels of the image.

According to one embodiment, the method further comprises calculating the remanence estimation for each of the at least some pixels by: calculating a moving average of the remanence measures of the image and of at least one previous image in the sequence.

According to one embodiment, the moving average is based on a sliding window of m images in the sequence, m being equal to between 20 and 150.

According to one embodiment, the method further comprises calculating the remanence estimation for each of the at least some pixels by applying Kalman filtering.

According to one embodiment, calculating the remanence estimation by applying Kalman filtering comprises: estimating a priori the remanence of each of the at least some pixels of the image based on a previous corrected remanence estimation of each of the at least some pixels and on a model of the exponential decay of the remanence; and correcting, for each of the at least some pixels of the image, the estimated remanence based on the corresponding remanence measure to obtain an a posteriori estimation.

According to one embodiment, the method further comprises detecting that the sequence of images corresponds to a changing scene prior to removing the remanence artifacts from the image.

According to a further aspect, there is provided a non-transitory storage medium storing computer instructions that, when executed by a processor of an image processing device, cause the above method to be implemented.

According to a further aspect, there is provided an image processing device comprising: at least one memory storing an image of a sequence of images captured by an infrared imaging device and one or more remanence measures of at least one previous image in the sequence; and one or more processors configured to remove remanence artifacts from the image by: inpainting a zone of remanence in the image to generate an inpainted image; generating a remanence measure for at least some pixels in the image based on the inpainted image; and removing remanence artifacts from at least some pixels of the image based on a remanence estimation for each of the at least some pixels, each remanence estimation being generated based on the remanence measures of a plurality of the images in the sequence.

According to one embodiment, the remanence estimation is a mean remanence estimation. For example, the mean remanence estimation corresponds to an estimation of an instantaneous mean remanence for each of the at least some pixels.

According to a further aspect, there is provided an infrared imaging device comprising: a microbolometer array; and the above image processing device.

According to a further aspect, there is provided an infrared camera comprising the above infrared imaging device.

According to yet a further aspect, there is provided a method of removing, by an imaging processing device, remanence artifacts from an image of a sequence of images captured by an infrared imaging device, the method comprising: generating a remanence measure for at least some pixels in the image based on a difference between the pixels values of the image and the pixel values a previous image of the sequence; and removing remanence artifacts from at least some pixels of the image based on a remanence estimation for each of the at least some pixels, each remanence estimation being generated based on the remanence measure and on one or more previous remanence estimations of the at least some pixels and on a model of the exponential decay of the remanence.

According to one embodiment, the remanence estimation is a mean remanence estimation. For example, the mean remanence estimation corresponds to an estimation of an instantaneous mean remanence for each of the at least some pixels.

According to one embodiment, generating the remanence measure for at least some pixels x in the image involves calculating:

$$\omega^*_{n,x} = f_{n,x} - f_{n-1,x} \quad \text{[Math 1]}$$

where $f_n$ is the image and $f_{n-1}$ is the previous image.

According to one embodiment, the method further comprising generating the remanence estimation for each of the at least some pixels by applying Kalman filtering.

According to one embodiment, generating the remanence estimation by applying Kalman filtering comprises: estimating a priori the remanence of each of the at least some pixels of the image based on a previous corrected remanence estimation of each of the at least some pixels and on the model of the exponential decay of the remanence; and correcting, for each of the at least some pixels of the image, the estimated remanence based on the corresponding remanence measure to obtain an a posteriori estimation.

According to one embodiment, the method further comprises detecting that the sequence of images corresponds to a static scene prior to removing the remanence artifacts from the image.

According to yet a further aspect, there is provided a non-transitory storage medium storing computer instructions that, when executed by a processor of an image processing device, cause the above method to be implemented.

According to yet a further aspect, there is provided an imaging processing device comprising: at least one memory storing an image of a sequence of images captured by an infrared imaging device and one or more remanence measures of at least one previous image in the sequence; and one or more processors configured to remove remanence artifacts from the image by: generating a remanence estimation for at least some pixels in the image based on a difference between the pixel values of the image and the pixel values a previous image of the sequence; and removing remanence artifacts from at least some pixels of the image based on an estimation of the remanence generated based on the remanence estimation and on one or more previous estimations of the remanence of the at least some pixels and on a model of the exponential decay of the remanence.

According to one embodiment, the remanence estimation is a mean remanence estimation. For example, the mean remanence estimation corresponds to an estimation of an instantaneous mean remanence for each of the at least some pixels.

According to yet a further aspect, there is provided an infrared imaging device comprising: a microbolometer array; and the above image processing device.

According to yet a further aspect, there is provided an infrared camera comprising the above infrared imaging device.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

Unless indicated otherwise, when reference is made to two elements connected together, this signifies a direct connection without any intermediate elements other than conductors, and when reference is made to two elements linked or coupled together, this signifies that these two elements can be connected or they can be linked or coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures, or to a microbolometer as orientated during normal use.

Unless specified otherwise, the expressions "around", "approximately", "substantially" and "in the order of" signify within 10%, and preferably within 5%.

Figure 1:
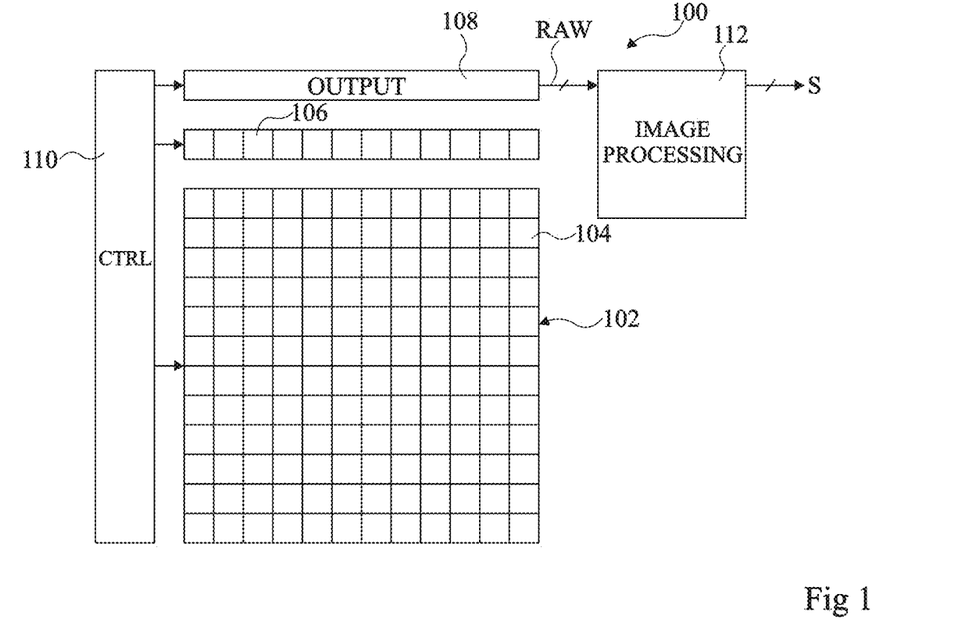
FIG. 1 schematically illustrates an IR imaging device according to an example embodiment of the present disclosure.

FIG. 1 illustrates an IR imaging device 100 comprising a pixel array 102 sensitive to IR light. The IR imaging device 100 for example forms part of an IR camera. In some embodiments, the pixel array 102 is sensitive to long-wave IR light, such as light with a wavelength in the range 7 to 16 μm or higher.

In the example of FIG. 1, the pixel array 102 comprises 144 microbolometer pixels 104 arranged in 12 rows and 12 columns. In alternative embodiments, the pixel array 102 could comprise any number of rows and columns of pixels. Typically, the pixel array 102 for example comprises 640 by 480, or 1024 by 768 microbolometer pixels.

In the example of FIG. 1, each column of pixels of the array 102 is associated with a corresponding reference structure 106. Though not functionally a picture element, this structure will be referred to herein as a "reference pixel" by structural analogy with the imaging (or active) microbolometer pixels 104. Furthermore, an output block (OUTPUT) 108 is coupled to each column of the pixel array 102 and to each of the reference pixels 106, and provides a raw image RAW comprising the signals or readings captured by the pixel array 102 in conjunction with the reference pixels 106.

An example of a pixel array of the bolometer type is for example discussed in more detail in the U.S. Pat. No. 7,700,919, assigned to the present applicant, the contents of which is hereby incorporated by reference to the extent permitted by the law.

A control circuit (CTRL) 110 for example provides control signals to the pixel array 102, to the reference pixels 106, and to the output block 108.

The raw image RAW is for example provided to an image processing circuit (IMAGE PROCESSING) 112, which for example applies 2-point image correction to the pixels of the image, and also remanence correction, to produce a corrected image S.

During a read operation of the pixel array 102, the rows of pixels are for example read out one at a time.

Figure 2:
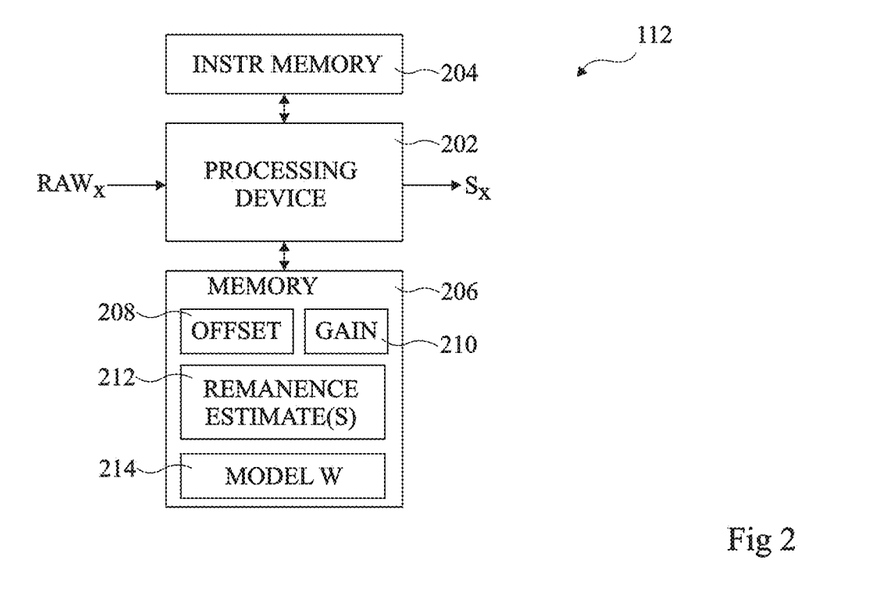
FIG. 2 schematically illustrates an image processing circuit of FIG. 1 in more detail according to an example embodiment.

FIG. 2 illustrates the image processing circuit 112 of FIG. 1 in more detail according to an example embodiment.

The functions of the image processing circuit 112 are for example implemented in software, and the image processing circuit 112 comprises a processing device (PROCESSING DEVICE) 202 having one or more processors under the control of instructions stored in an instruction memory (INSTR MEMORY) 204. In alternative embodiments, the functions of the image processing circuit 112 could be implemented at least partially by dedicated hardware. In such a case, the processing device 202 for example comprises an ASIC (application specific integrated circuit) or FPGA (field programmable gate array), and the instruction memory 204 may be omitted.

The processing device 202 receives the raw input image RAW, and generates the corrected image S, which is for example provided to a display (not illustrated) of the imaging device.

The processing device 202 is also coupled to a data memory (MEMORY) 206 for example storing offset values (OFFSET) 208 and gain values (GAIN) 210 used to implement the 2-point image correction.

In some embodiments, shutterless image correction is performed. For example, the offset values are in the form of a vector $V_{COL}$ representing a structural column spread, and a matrix $OFF_{DISP}$ representing a 2D non-column structural dispersion introduced by the pixel array 102. The column spread for example principally results from the use of the reference pixel 106 in each column, whilst the row of column reference pixels is generally not perfectly uniform. The 2D non-column dispersion for example principally results from local physical and/or structural differences between the active bolometers of the pixel array resulting for example from technological process dispersion.

An example of a shutterless image correction technique and, in particular, of the generation of the vector $V_{COL}$ and of the matrix $OFF_{DISP}$, and of the correction of pixel values based on this vector and matrix, is described in more detail in the US patent application U.S. Ser. No. 14/695,539 filed on Apr. 24, 2015 assigned to the present applicant, the contents of which is hereby incorporated by reference to the extent permitted by the law.

In alternative embodiments, different types of 2-point image correction could be implemented, including solutions that involve the use of a shutter.

The memory 206 also for example stores one or more remanence estimates (REMANENCE ESTIMATE(S)) 212 calculated for pixels of one or more previously captured images, as will be described in more detail below. In some embodiments, the memory 206 also stores a model W (MODEL W) representing remanence decay, as will be described in more detail below.

Figure 3:
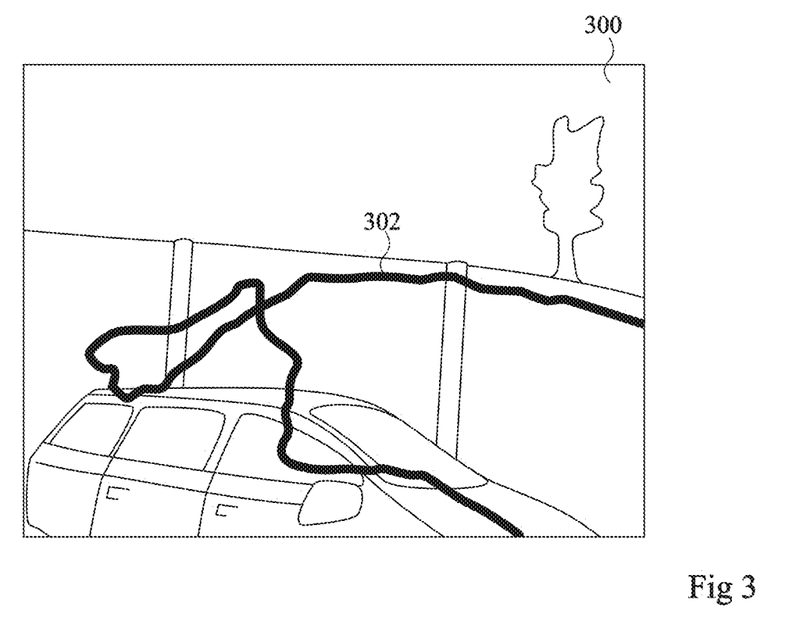
FIG. 3 represents an image comprising a remanence artifact.

FIG. 3 represents an image 300 in which a remanence artifact 302 is present. For example, this image was captured by a microbolometer array, and while the array was active, a glare, and in particular a flux of relatively intense heat, was received by the array. The resistance of the thermal layer of each pixel of the microbolometer array should vary as a function of temperature, the higher the temperature, the lower the resistance. In the image 300, for readability, the gray levels have been inverted: high temperatures are represented by darker pixels. The flux of relatively intense heat causes a significant, persistent, decrease in the resistance of the concerned pixels, leading to the dark trail 302 in the image 300 corresponding to the path of the flux across the microbolometer array. When resulting from the heat of the sun, such an artifact is often referred to as sunburn.

Figure 4:
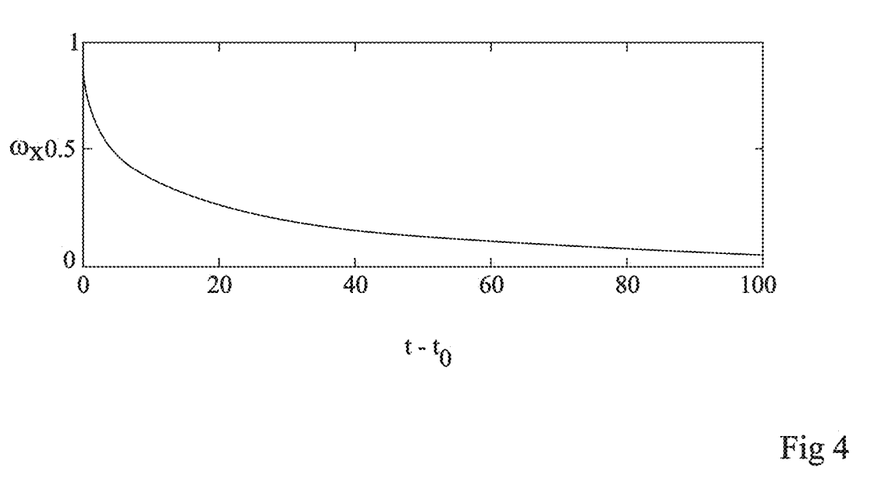
FIG. 4 is a graph representing exponential decay of the remanence of a pixel.

FIG. 4 is a graph representing an example of the remanence $\omega_x$ of a pixel x of a microbolometer array such as the array 102 of FIG. 1, as a function of time, according to an example embodiment. The remanence $\omega_x$ has an exponential decay that can be modelled by the following equation:

$$\omega_x(t - t_0; \tau, \alpha, \beta) = \alpha e^{-\left(\frac{t-t_0}{\tau}\right)^\beta} 1_{t > t_0} \quad \text{[Math 2]}$$

where: $t_0$ is the time when the pixel returned to its normal temperature following the instant of the glare hitting the pixel; x=(row, column) is the coordinate vector of the pixel; α, β and τ are parameters; and:

$$1_{t>t_0} = \begin{cases} 1, & \text{if } t > t_0 \\ 0, & \text{else} \end{cases} \quad \text{[Math 3]}$$

is the characteristic function. In the example of FIG. 4, $\tau=10$, $\alpha=1$, and $\beta=0.5$.

Remanence is an additive perturbation. Thus the pixel values $f_x(t)$ of an image affected by remanence can be modelled as:

$$f_x(t)=\omega_x(t-t_0;\tau,\alpha,\beta)+G_{\omega_x}(t-t_0)S_x(t) \quad \text{[Math 4]}$$

where $S_x(t)$ is the image without the glare, $G_{\omega_x}$ is the gain change matrix due to the glare and $f_x(t)$ for example corresponds to 2-point image correction as described above. A method for performing correction based on a gain change matrix is described in more detail in French patent FR2987210, the contents of which is hereby incorporated by reference to the extent permitted by the law. However, the change in sensitivity of the pixels represented by the term $G_{\omega x}(t-t_0)S_x(t)$ can be considered small with respect to $\omega_x$, and in the following, its contribution will be ignored by considering the term $G_\omega$ as equal to 1.

When an IR imaging device, such as the device 100 of FIG. 1, is used to capture an IR image, there are several different use cases than can be distinguished.

A dynamic situation (hereafter Case 1) can be considered in which the image in the field of view of the pixel array can be considered to be varying, because the IR camera is moving and/or because the scene is changing. For this type of dynamic situation, the above model is appropriate as both the remanence $\omega_x(t)$ and the image $S_x(t)$ are varying in time:

$$f_x(t)=\omega_x(t)+S_x(t) \quad \text{[Math 5]}$$

Another situation (hereafter Case 2) corresponds to a case in which the image in the field of view of the pixel array is substantially constant. Thus, only the remanence is varying with time. In such a case, the pixel values $f_x(t)$ of an image affected by remanence can be modelled as:

$$f_x(t)=\omega_x(t)+S_x \quad \text{[Math 6]}$$

where the image $S_x$ without glare can be assumed to be constant.

In both Case 1 and Case 2, a stream of images is for example captured and stored to form a video file and/or relayed in near real-time to an image display of the IR camera.

A third situation (hereafter Case 3) corresponds to a case in which both the image in the field of view of the IR camera and the remanence are varying sufficiently slowly that they can both be considered as constant over time, in other words the time decay is so slow that it cannot be measured within the time frame of assessment. The pixel values $f_x$ of the image in this case can be modelled as:

$$f_x=\omega_x+S_x \quad \text{[Math 7]}$$

Methods for at least partially removing artifacts caused by remanence for Case 1 and Case 2 will be now be described in more detail. Case 3, which is equivalent to image retouching of a single image with no additional temporal information concerning the lost pixel information, will not be addressed in the present disclosure.

Below, the time is sampled by denoting t=n and t+δt=n+1. Hence the value of a matrix M at time t and pixel x will be denoted $M_{n,x}$ instead of M(t,x).

General Scheme

Figure 5:
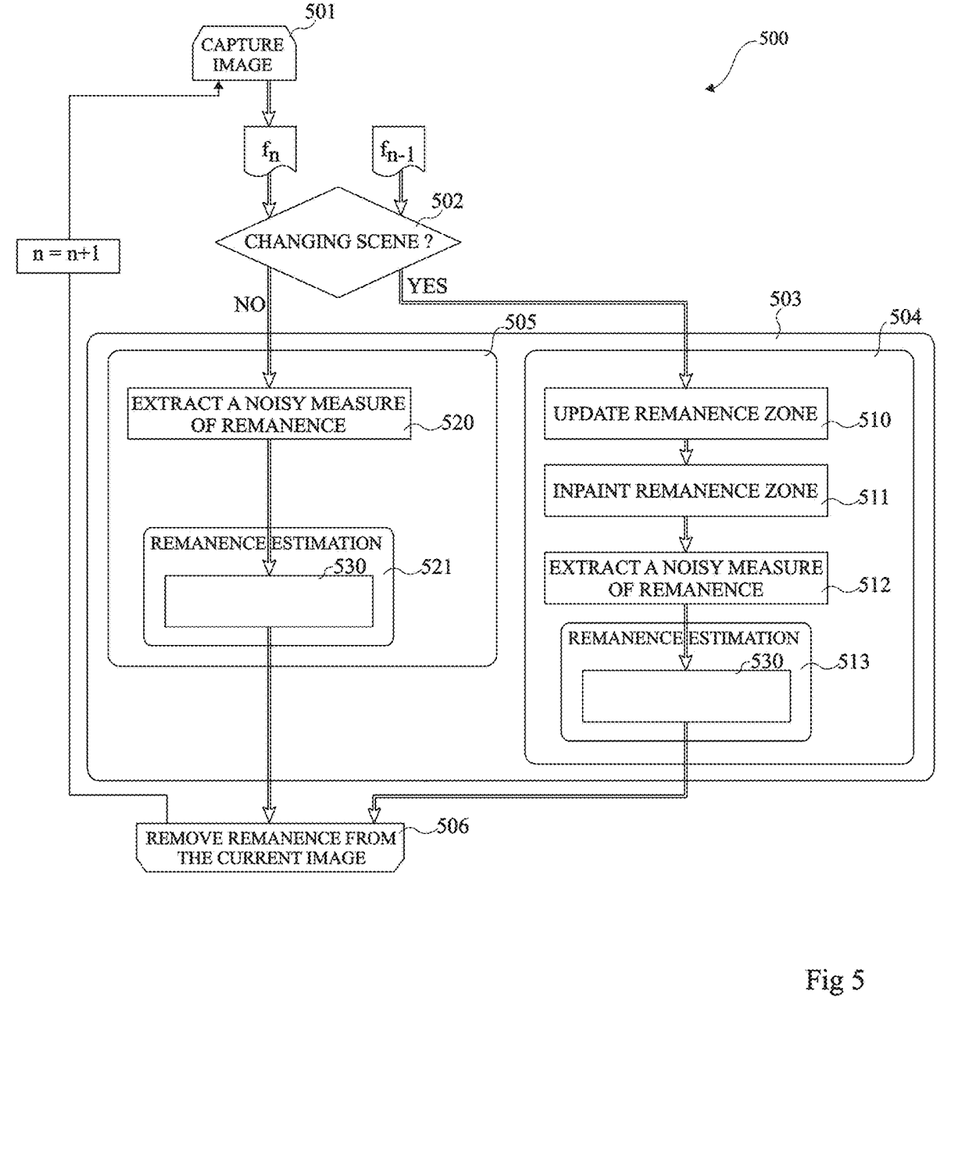
FIG. 5 is a general flow diagram illustrating operations in a method of removing remanence from an image according to an example embodiment of the present disclosure.

FIG. 5 is a general flow diagram illustrating operations in a method 500 of correcting remanence in a sequence of images according to an example embodiment of the present disclosure. This method is for example implemented by the image processing circuit 112 of FIGS. 1 and 2. Alternatively, the method could be implemented by another type of processing device that may or may not form part of an IR camera.

Image Capture

In an operation 501, the method starts when an image $f_n$ is captured. This image for example corresponds to a raw image $RAW_n$ to which image correction has been applied, such as 2-point image correction described above.

Change Detection

After operation 501, an operation 502 is for example implemented in which the presence of a changing scene is detected based on the image $f_n$ and on a previously captured image $f_{n-1}$. The operation 502 is followed by a remanence estimation method 503 involving, for example, estimating a current remanence mean $\mu_{\omega,n,x}$ at each pixel x of the current image n. The detection of a changing scene in operation 502 is used to select between alternative methods 504 and 505 of performing the remanence estimation operation 503. In particular, if a changing scene is detected in operation 502, in the subsequent remanence estimation method 503, the method of Case 1 is applied corresponding to the method 504 in FIG. 5. If, on the contrary, a static scene is detected, in the subsequent remanence estimation method 503, the method of Case 2, corresponding to the method 505 in FIG. 5, is applied.

For example, the dynamic of the scene can be detected in operation 502 by comparing a temporal change with a threshold that is set to be above the temporal noise level, for example at two or three times the temporal noise level. Such an evaluation could be performed globally for the image, such as based on average temporal changes, in which case all the pixels of the image are for example processed according to the same method (the method 504 of Case 1, or the method 505 of Case 2). Alternatively, a local evaluation could be performed based on the temporal change at individual pixels or individual sub-regions of the image, and a selection between applying the method 504 of Case 1 or the method 505 of Case 2 could be made pixel by pixel or sub-region by sub-region.

The method 504 is described in more detail below in a subsection entitled Case 1, and the method 505 is described in more detail below in a subsection entitled Case 2.

While FIG. 5 illustrates a method involving the execution of both methods 504 and 505, the selection between these methods being made for each frame based on the scene change detection, in alternative embodiments, only the method 504 or only the method 505 could be implemented.

Remanence Correction

After the operation 503, an operation 506 is for example implemented, involving correcting the image based on the estimated remanence. For example, the image is corrected by applying the following equation for each pixel x of the image $f_n$ to generate the image $S_n$:

$$S_{n,x}=f_{n,x}-\mu_{\omega,n,x} \quad \text{[Math 8]}$$

After operation 506, n is incremented and the operations 501 to 506 are for example repeated following capture of the subsequent image n.

Case 1

Remanence Zone Detection

In case 1, the method 503 involves applying the method 504 of FIG. 5 involving operations 510 to 513.

In the operation 510, one or more remanence zones are updated.

For example, a mask is generated for each image $f_n$ indicating the zones of remanence. These zones can be larger than the actual zones in which the pixels are impacted by the remanence. However, in some embodiments, the remanence zones correspond to at most 75% of the pixels of the image. The mask can for example be generated by detecting zones in which the pixel values are significantly higher than in surrounding areas, by tracking for example the sun's trajectory, although other techniques, including techniques based on edge detection, could also be used.

Inpainting

Then, in the operation 511, an inpainting is applied to those remanence zones in the image. Inpainting is an image reconstruction technique that is known in the art and involves correcting pixel values within the targeted zone based on image information from outside the targeted zone. As an example, a method of inpainting is described in more detail in the 2014 publication by C. Guillemot and O. Le Meur entitled "Image inpainting: Overview and recent advances", IEEE signal processing magazine, 31(1), 127-144, the contents of which is hereby incorporated by reference to the extent permitted by the law.

Remanence Measurement

In the operation 512, a noisy measure $\omega^*_{n,x}$ of the remanence at pixel x in the image $f_n$ is processed for each pixel based on the inpainted image. For example, this noisy measure is calculated by performing the following subtraction pixel by pixel:

$$\omega^*_{n,x} = f_{n,x} - S^*_{n,x} \quad \text{[Math 9]}$$

where $S^*_{n,x}$ is the nth inpainted image at pixel x.

Remanence Estimation

In the operation 513, the remanence is estimated by applying a remanence estimation operation 530. For example, the remanence estimation comprises an estimation of an instantaneous mean remanence $\mu_{\omega,n,x}$ for each pixel x. This for example involves, for each pixel x, generating a current estimation of the remanence $\omega_{n,x}$ as a weighted sum between the current remanence measure $\omega^*_{n,x}$ and the previous estimation of the remanence $\omega_{n-1,x}$. In some embodiments, the operation 530 involves generating the estimation $\omega_{n,x}$ simply as an average of the measured remanence $\{\omega^*_{k,x}\}_{k=n-M:n}$ in the previous m images. In alternative embodiments, the operation 530 involves generating the estimation $\omega_{n,x}$ based on a Kalman filter that takes into account a model of temporal decay of the remanence. For example, the exponential model W may be used. Using a Kalman filter, the estimators of $\omega_{n,x}$ are for example its mean $\mu_{\omega,n,x}$ and its variance $\sigma^2_{\omega,n,x}$ that fully characterize it.

The method 504 permits the remanence to be removed based on an observation by the present inventors that, when the image in the field of view of the pixel array is changing, the temporal variation of the pixel values can be considered as noise having a normal distribution centered on $\mu_{\mu,n,x}$.

Figure 6:
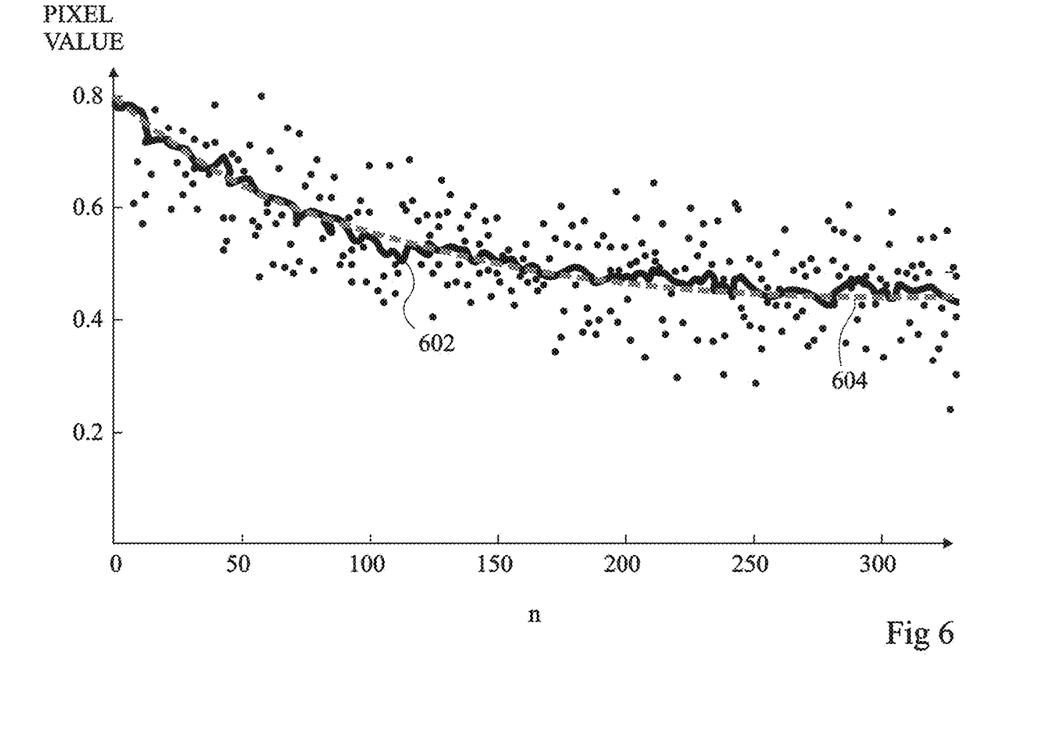
FIG. 6 is a graph showing an example of simulated pixel values of a pixel x suffering from remanence over a sequence of 300 images.

FIG. 6 is a graph showing an example of simulated pixel values (PIXEL VALUE) of a pixel x suffering from remanence over a sequence of 300 images n captured at an image capture rate of, for example, 25 frames per second. The dots in FIG. 6 represent the 300 pixel values, and a continuous curve 602 represents an estimated remanence mean over time. A dashed curve 604 in FIG. 6 represents the true remanence $\omega_x$, which has an exponential decay. By obtaining a reasonably accurate estimation of this true remanence $\omega_x$ for a given image, it can be subtracted from the pixel value in order to provide the underlying pixel information representing the image scene.

Indeed, considering that the image in the field of view of the pixel array is varying over time, the scene can be considered as stationary noise defined as follows:

$$S_{n,x} \sim N(\mu_S, \sigma_S^2) \quad \text{[Math 10]}$$

where "$\sim$" signifies "is distributed according to" and $N(\mu,\sigma^2)$ is the normal distribution having average value $\mu$ and variance $\sigma^2$, which are here constant over time and space.

The remanence is however non-stationary noise as it has an average value that decays over time:

$$\omega_{n,x} \sim N(\mu_{\omega,n,x}, \sigma_\omega^2) \quad \text{[Math 11]}$$

The observed image at pixel x of an image $f_n$ is thus the sum of two independent random variables:

$$f_{n,x} = S_{n,x} + \omega_{n,x} \sim N(\mu_S + \mu_{\omega,n,x}, \sigma_S^2 + \sigma_\omega^2) \quad \text{[Math 12]}$$

Figure 7:
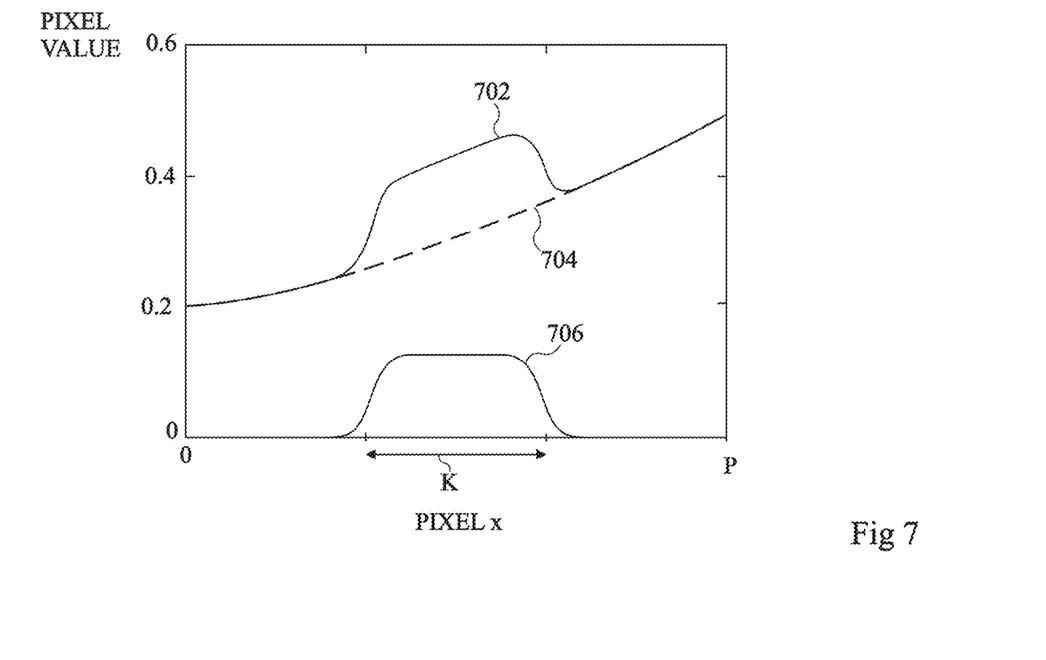
FIG. 7 is a graph showing an example of simulated pixel values across a microbolometer array with a remanence area K.

FIG. 7 is a graph illustrating simulated pixel values (PIXEL VALUE) of the pixels (PIXEL x) from 0 to P across the microbolometer array, in which it is assumed that pixels in a zone K are in the path of a sunburn.

FIG. 7 represents, by a continuous curve 702, an example of the observed image $f_{n,x}$, which is the sum of the average of the image scene $\mu_{S,n}$ represented by a dashed curve 704 and the average remanence $\mu_{\omega,n,x}$ represented by a continuous curve 706. Therefore, by estimating the average of the image scene $\mu_{S,n,x}$, it is possible to obtain $\mu_{\omega,n,x}$ by calculating:

$$\mu_{\omega,n,x} = f_{n,x} - \mu_{S,n,x} \quad \text{[Math 13]}$$

In the operation 513 of the method 504 of FIG. 5, the present inventors propose to obtain the estimation of the average of the image scene $\mu_{S,n}$ using inpainting, which will now be described in more detail with reference to FIG. 8.

Figure 8:
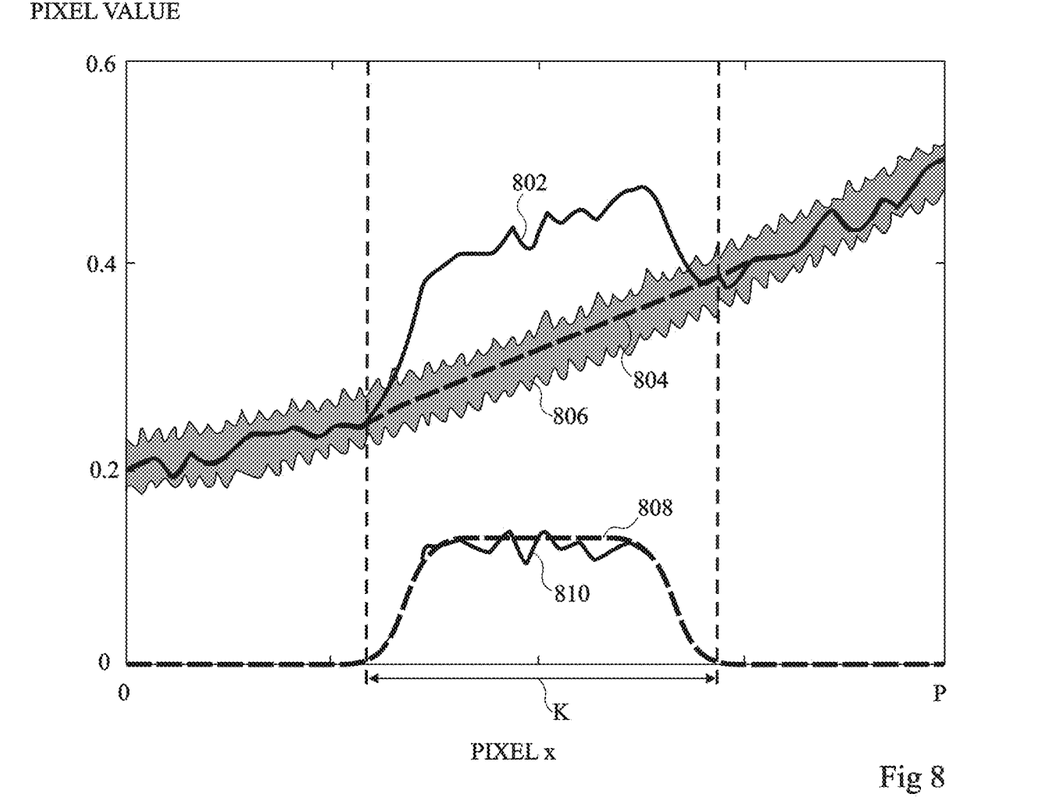
FIG. 8 is a graph showing a further example of simulated pixel values across a microbolometer array.

FIG. 8 is a graph illustrating pixel values (PIXEL VALUE) of the pixels (PIXEL x) from 0 to P across the microbolometer array, in which it is assumed, similarly to the example of FIG. 7, that pixels in a zone K are in the path of a sunburn.

A continuous curve 802 in FIG. 8 represents a line of the observed image $f_n$, and a dashed curve 804 represents this line inpainted, denoted $S^*_n$, which can be expressed as follows:

$$S^*_n = \text{Inpaint}(f_{\bar{K},n} | f_{K,n}) \quad \text{[Math 14]}$$

where K_bar is the zone outside the sunburn zone K. In other words, pixel information from the zone outside of the sunburn zone is used to inpaint the zone K.

The curves 806 in FIG. 8 represent successive samples of S. They demonstrate that the inpainting curve 804 is not biased:

$$E[S^*] = \mu_S \quad \text{[Math 15]}$$

where $E[\ ]$ is the expected value.

A dashed curve 808 represents the remanence $\omega_n$, and a continuous curve 810 represents the result of the subtraction $f_n - S^*_n$.

In can be assumed that the inpainted portion of the image provides an unbiased estimation of the average of the image scene $\mu_S$:

$$S^*_n \sim N(\mu_S, \sigma_S^2) \quad \text{[Math 16]}$$

and thus an unbiased measure of $\mu_{\omega,n,x}$:

$$\omega^*_{n,x} = f_{n,x} - S^*_{n,x} \sim N(\mu_{\omega,n,x}, \sigma_S^2 + \sigma_\omega^2) \quad \text{[Math 17]}$$

Figure 9:
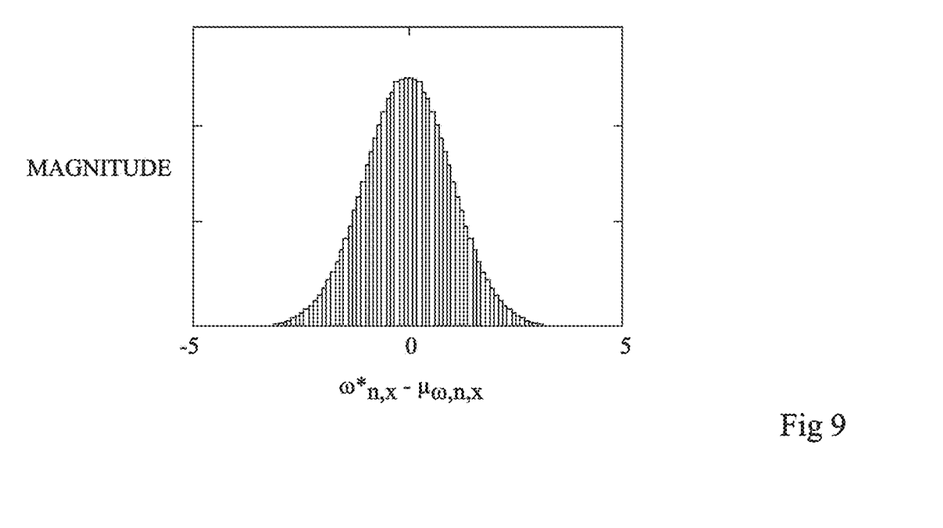
FIG. 9 is a graph representing a distribution of the difference between remanence estimates and average remanence values.

FIG. 9 is a graph representing the distribution of the magnitude (MAGNITUDE) of the difference between the measurement $\omega^*_{n,x}$ of the remanence and the average remanence $\mu_{\omega,n,x}$, which corresponds to the normal distribution. Indeed, at every time instant, the measure of $\omega^*_n$ corresponding to:

$$\omega^*_n = f_n - S^*_n \quad \text{[Math 18]}$$

provides an unbiased noisy measurement of the expected value $E[\omega^*_{n,x}] = \mu_{\omega,n,x}$ of the remanence.

As this value varies with time, the present inventors propose to estimate this value for each new image $f_n$ based on a weighted sum between the current measurement $\omega^*_n$ and the previous estimate $\mu_{\omega, n-1}$, as will now be described in more detail with reference to FIG. 10.

Figure 10:
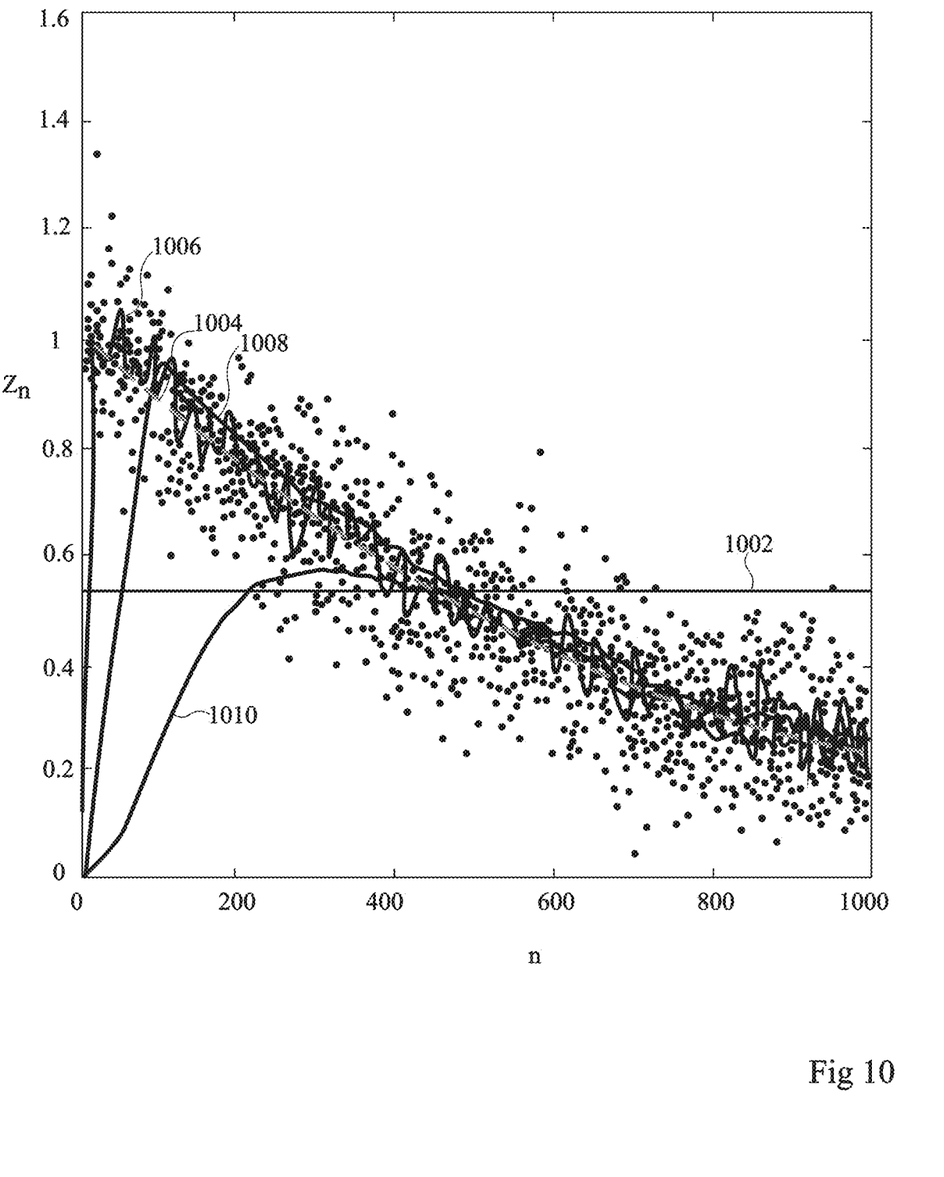
FIG. 10 is a graph representing values of estimations of the remanence of one pixel along a sequence of n=1000 consecutive images and the estimated remanence values using various methods.

FIG. 10 is a graph representing values $z_n$ of the estimations of the remanence of one pixel x along a sequence of n=1000 consecutive frames. Each continuous curve corresponds to a different method for estimating, in the operation 530 of FIG. 5, the value $\mu_{\omega,n,x}$. The dots correspond to the raw remanence $\omega^*_{n,x}$ measurements. A line 1002 represents the average of these raw remanence measurements $\omega^*_{n,x}$, which can be expressed as:

$$\mu_{\omega,n} = \frac{1}{n}\sum_{k=1}^{n} \omega^*_k \quad \text{[Math 19]}$$

A dashed curve 1004 in FIG. 10 represents the true decay of the remanence of the pixel x.

A continuous curve 1006 in FIG. 10 represents a moving average based on a window of 10 images, which can be expressed as:

$$\mu_{\omega,n} = \frac{1}{10}\sum_{k=n-10}^{n} \omega^*_k \quad \text{[Math 20]}$$

The curve 1006 provides fast convergence, but is relatively noisy.

A curve 1008 in FIG. 10 represents a moving average based on a window of 100 images, which can be expressed as:

$$\mu_{\omega,n} = \frac{1}{100}\sum_{k=n-100}^{n} \omega^*_k \quad \text{[Math 21]}$$

The curve 1008 still provides relatively fast convergence, and is less noisy that the curve 1006. However, this curve is biased, and such a bias risks being visible in the final corrected image.

In some embodiments, in order to obtain a reasonable compromise between speed of convergence and noise, a moving average could be used based on a sliding window of m images, where m is in the range 20 to 150 and for example in the range 20 to 80. In some embodiments, the number m of images is variable with time, for example increasing in time as the image sequence progresses. In some embodiments, there may be drawbacks with this approach based on a sliding window, if for example the result is still biased to some extent, and if there is a need to calibrate the size of the sliding window.

A curve 1010 in FIG. 10 corresponds to the application of a Kalman filter, which has a relatively slow convergence in comparison with the moving average, but converges with relatively high precision to the true decay of the remanence represented by the curve 1004. The Kalman filter takes into account measurements of the remanence for a plurality of images in the sequence, and also the model W of the exponential decay of the remanence. The use of a Kalman filter in the operation 530 will now be described in more detail with reference to FIGS. 11 and 12.

Kalman Filtering

Figure 11:
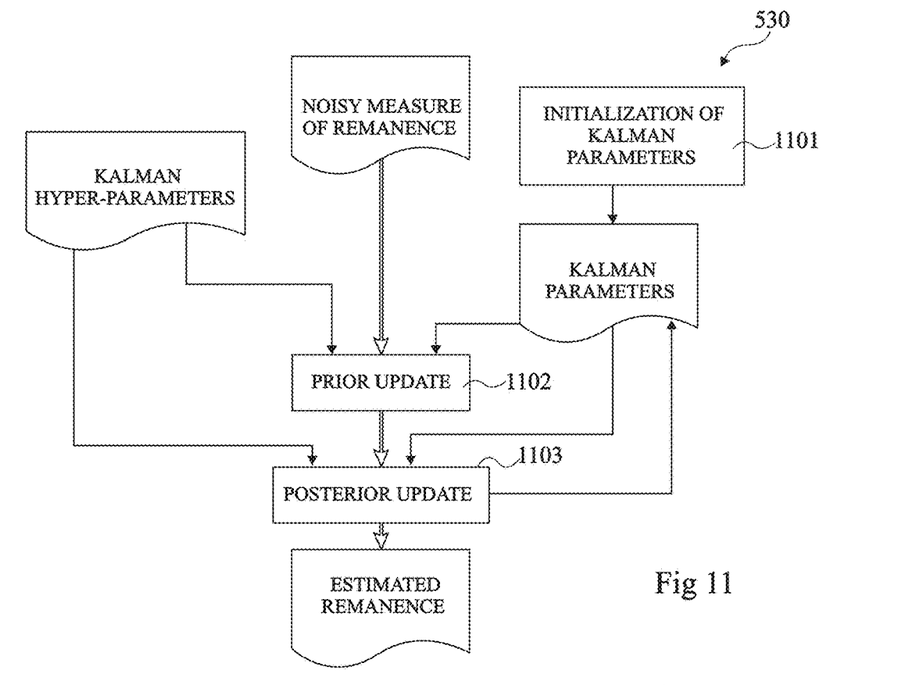
FIG. 11 is a flow diagram illustrating operations in a method of performing Kalman filtering to generate remanence estimations according to an example embodiment of the present disclosure.

FIG. 11 is a flow diagram illustrating operations in a method of estimating the average remanence value $\mu_{\omega,n,x}$ using a Kalman filter in the operation 513 of FIG. 5. This method is for example implemented by the image processing circuit 112 of FIGS. 1 and 2. Alternatively, the method could be implemented by another type of processing device that may or may not form part of an IR camera.

Kalman filters are well suited for estimating a latent (hidden) state vector $\omega_n$ at each step n of a linear-Gaussian dynamical time series using a noisy (observed) measure $\omega_n^*$ and knowing some hyper-parameters. Such time series are a kind of Markov chain and can be fully described by the following simple sequence:

$$\omega_n = A\omega_{n-1} + v,$$

$$\omega^*_n = H\omega_n + \eta,$$

$$\omega_0 = \mu_{\omega,0} + u, \quad \text{[Math 22]}$$

where A is the transition matrix, H is the measurement matrix, and the parameters v, u and $\eta$ are some zero-mean normal additive noises of covariance matrices $\Gamma$, $\Sigma_{\omega,0}$ and R respectively.

Figure 12:
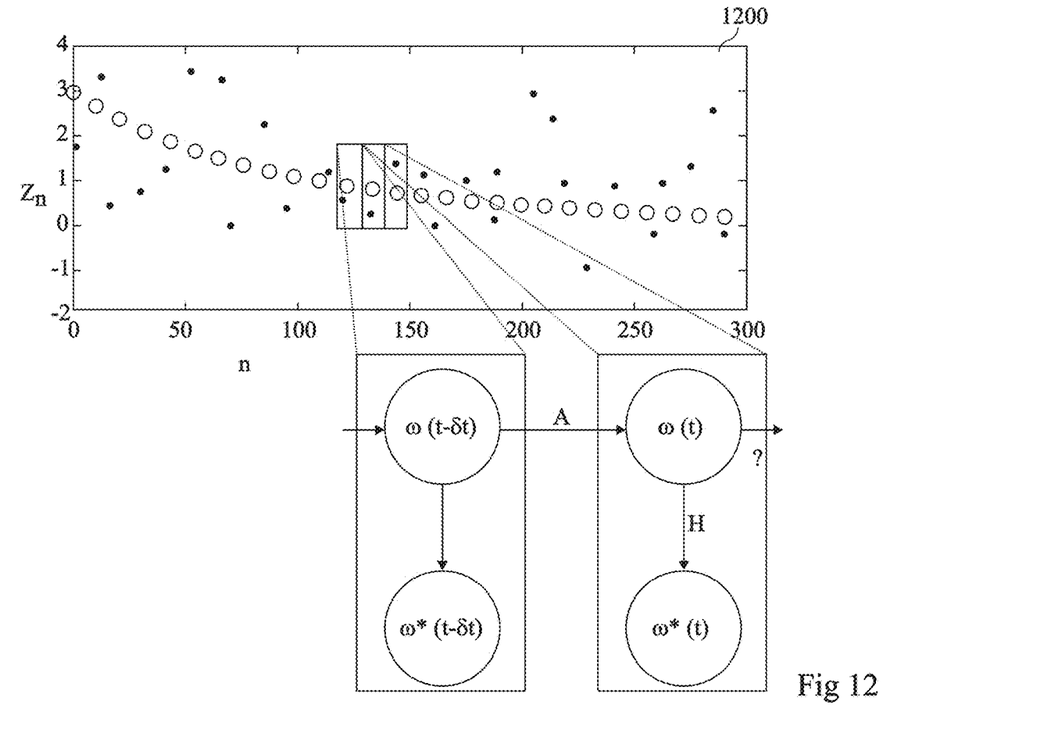
FIG. 12 illustrates the latent structure of a valid time series for application of a Kalman filter.

FIG. 12 illustrates an example of such time series, where the hidden state vector (of dimension 1 in this example) are the circles and the observed measures are the dots. The inputs from a time $(t-\delta t)$ are the previous corrected estimates of the remanence $\omega(t-\delta t)$, and the transition matrix A linking the previous estimate at time $(t-\delta t)$ to the new estimate at time t. Because everything is Gaussian in this time series, the state vector is fully characterized by its mean vector $\mu_\omega$ and covariance matrix $\Sigma_\omega$, which are the unknown values to be determined.

At each step n, it is shown [Murphy, Machine Learning, a probabilistic perspective, 2012 p. 638] that knowing the (time-constant) hyper-parameters $\Gamma$, R, U, A, H and $\mu_0$, the latent state $\omega_n$ may be estimated using the following equations:

$$\mu^-_{\omega,n,x} = A\omega_{n-1,x},$$

$$\Sigma^-_{\omega,n,x} = A\Sigma_{\omega,n-1,x}A^T + \Gamma,$$

$$\mu_{\omega,n,x} = \mu^-_{\omega,n,x} + K_{n,x}(\omega^*_{n,x} - H\mu^-_{\omega,n,x}),$$

$$\Sigma_{\omega,n,x} = (I - K_{n,x}H)\Sigma^-_{\omega,n,x}, \quad \text{[Math 23]}$$

where:

$$K_{n,x} = \Sigma^-_{\omega,n,x}H^T(H\Sigma^-_{c\omega,n,x}H^T + R)^{-1} \quad \text{[Math 24]}$$

is the Kalman gain and I is the identity matrix.

In other words, at each step n, a new a posteriori estimation $(\mu_{\omega,n,x}, \Sigma_{\omega,n,x})$ is estimated from a measurement $\omega_n^*$ and an a priori estimation $(\mu^-_{\omega,n,x}, \Sigma^-_{\omega,n,x})$.

Application to Remanence Filtering

Covariance Matrices

In the present disclosure, the hidden variable $\omega$ is the remanence at each pixel and is a scalar. Hence the covariance matrices $\Gamma$, R, $\Sigma_{\omega,0}$, $\Sigma_\omega$ are only variances denoted respectively $\gamma$, r, $\sigma^2_{\omega,0}$, $\sigma^2_\omega$.

Transition Matrix A

In the present disclosure, the hidden state is scalar and the transition matrix A is also a scalar noted a and is directly related to the model W of the remanence. As described in relation with FIG. 4 above:

$$W = \omega(t) = \alpha e^{-\left(\frac{t-t_0}{\tau}\right)^\beta} 1_{t>t_0} \quad \text{[Math 25]}$$

$$\frac{\delta\omega(t)}{\delta t} = -\frac{\beta}{\tau}\left(\frac{t-t_0}{\tau}\right)^{\beta-1}\omega(t) \quad \text{[Math 26]}$$

In the present example, the parameter $\beta$ is assumed to equal 1, leading to a model for $\omega(t+\delta t)$ as follows:

$$\omega(t+\delta t) = a\omega(t), \text{ with } a = 1 - \frac{\delta t}{\tau} \quad \text{[Math 27]}$$

The transition matrix a is for example common for all pixels of the array. Alternatively, a different transition matrix $a_x$ could be stored for each pixel.

Measurement Matrix H

As it is described above the measure $\omega_n^*$ is also a real scalar value which is directly related to the hidden state using the measurement matrix H:

$$\omega^*_{n,x} = H\omega_{n,x} + \eta, \text{ with } H=1 \quad \text{[Math 28]}$$

Initialisation

In an operation 1101 of the method 530 of FIG. 11, the Kalman parameters are initialized by initializing the hidden state of the Kalman filter. For example, an initial average $\mu_{\omega,0}$ and variance $\sigma_{\omega,0}^2$ values may be initialized for all pixels x as:

$$\mu_{\omega,0,x} = 0, \forall x \quad \text{[Math 29]}$$

and $$\sigma_{\omega,0,x}^2 = 999, \forall x \quad \text{[Math 30]}$$

A Priori Estimation

In an operation 1102, a new a priori estimate is generated for the average remanence based on the noisy measure of remanence, and on the Kalman parameters and the Kalman hyper-parameters. For example, the new a priori estimate is generated for the average remanence at a time n+1:

$$\mu_{\omega,n,x}^- = a\mu_{\omega,n-1,x}$$

$$\sigma_{\omega,n,x}^{-2} = a^2\sigma_{\omega,n-1,x}^2 + \gamma \quad \text{[Math 31]}$$

where $\gamma$ is the variance of the model, and is for example user-defined.

A Posteriori Estimation

In an operation 1103, the prior new mean and variance values of the remanence are corrected based on the Kalman parameters, the Kalman hyper-parameters, and the current measured remanence value $\omega_{n,x}^*$, determined based on the inpainted image:

$$\mu_{\omega,n,x} = (1-K_{n,x})\mu_{\omega,n,x}^- + K_{n,x}\omega^*_{n,x}$$

$$\sigma_{\omega,n,x}^2 = (1-K_{n,x})\sigma_{\omega,n,x}^{-2} \quad \text{[Math 32]}$$

where:

$$K_{n,x} = \sigma_{\omega n,x}^{-2}(\sigma_{\omega n,x}^{-2} + r)^{-1} \quad \text{[Math 33]}$$

is the Kalman gain.

In other words, an a posteriori estimate of the remanence is generated as the balance between the prior estimate and the measure, and the balance is tuned by the Kalman gain K.

Sequence

With reference again to FIG. 11, after operation 1103, the Kalman parameters are for example updated. As represented in FIG. 5, the method 530 may then be repeated for the next image n+1, involving repeating the operations 1102 and 1103 based on the updated Kalman parameters. Indeed, the parameter initialization operation 1101 is for example performed only on a first iteration of the method of FIG. 5.

Case 2

In case 2, the operation 503 of FIG. 5 involves the method 505 corresponding to a method of correcting remanence in a sequence of images according to a further example embodiment of the present disclosure. This method is for example implemented by the image processing circuit 112 of FIGS. 1 and 2. Alternatively, the method could be implemented by another type of processing device that may or may not form part of an IR camera.

The method 505 involves operations 520 and 521.

In the operation 520, a measure of the remanence in the image $f_n$ is calculated for each pixel based on a previous image $f_{n-1}$. For example, a measure $\omega^*_{n,x}$ of the remanence is calculated for each pixel x of the image by performing the following subtraction:

$$\omega^*_{n,x} = f_{n,x} - f_{n-1,x} \quad \text{[Math 34]}$$

In the operation 521, the remanence $\omega_{n,x}$ of each pixel is estimated based on the remanence measurement and on the exponential decay model W. For example, the remanence estimation comprises an estimation of an instantaneous mean remanence $\mu_{\omega,n,x}$ for each pixel x. In some embodiments, the remanence mean $\mu_{\omega,n,x}$ and its variance $\sigma^2_{\omega,n,x}$ are estimated using a Kalman filter as described above in relation with FIG. 11. However, for the case of a static scene, the measurement $\omega^*$ is very noisy and therefore, for Case 2, the transition matrix a should generally be more accurate than in Case 1. Therefore, in some embodiments, a local transition matrix $a_x = 1 - \delta t/\tau_x$ of exponential decay of the remanence is stored in the memory 206 for each pixel x. These transition matrices are for example estimated during a preprocessing operation, involving, for example, regressing the exponential decay on two or more of the first frames just following the occurrence of the remanence for estimating $\tau_x$. Moreover, in case 2, the transition matrix is:

$$H_x = 1 - \exp\left(\frac{\delta t}{\tau_x}\right) \quad \text{[Math 35]}$$

An advantage of the embodiments described herein is that remanence can be corrected in sequences of images for the case of a changing scene (Case 1) or a static scene (Case 2), in a relatively simple and effective manner.

Various embodiments and variants have been described. Those skilled in the art will understand that certain features of these embodiments can be combined and other variants will readily occur to those skilled in the art. For example, it will be apparent to those skilled in the art that the choice between providing a common exponential decay model W for all pixels, or different models for each pixel x, will depend on the required precision and on the characteristics of the IR pixel array.

The invention claimed is:

1. A method of removing, by an imaging processing device, remanence artifacts from an image ($f_n$) of a sequence of images captured by an infrared imaging device, the method comprising:
   inpainting a zone of remanence (K) in the image ($f_n$) to generate an inpainted image;
   generating a remanence measure ($\omega^*_{n,x}$) for at least some pixels in the image ($f_n$) based on the inpainted image; and
   removing remanence artifacts from at least some pixels of the image ($f_n$) based on a remanence estimation ($\mu_{n,x}$) for each of the at least some pixels, each remanence estimation ($\mu_{n,x}$) being generated based on the remanence measures ($\omega^*_{n,x}$) of a plurality of the images in the sequence.

2. The method of claim 1, wherein the remanence estimation is a mean remanence estimation ($\mu_{n,x}$) corresponding to an estimation of an instantaneous mean remanence for each of the at least some pixels.

3. The method of claim 1, wherein generating the remanence measure ($\omega^*_{n,x}$) for at least some pixels in the image ($f_n$) comprises subtracting, from each pixel value of the at least some pixels of the image ($f_n$), a pixel value of a corresponding pixel in the inpainted image.

4. The method of claim 1, further comprising detecting the zone of remanence (K) in the image ($f_n$).

5. The method of claim 4, wherein the zone of remanence (K) comprises less than 75% of pixels of the image.

6. The method of claim 1, further comprising calculating the remanence estimation ($\mu_{n,x}$) for each of the at least some pixels by:
   calculating a moving average of the remanence measures ($\omega^*_{n,x}$) of the image ($f_n$) and of at least one previous image in the sequence.

7. The method of claim 6, wherein the moving average is based on a sliding window of m images in the sequence, m being equal to between 20 and 150.

8. The method of claim 1, further comprising calculating the remanence estimation ($\mu_{n,x}$) for each of the at least some pixels by applying Kalman filtering.

9. The method of claim 8, wherein calculating the remanence estimation ($\mu_{n,x}$) by applying Kalman filtering comprises:
   estimating a priori the remanence of each of the at least some pixels of the image ($f_n$) based on a previous corrected remanence estimation of each of the at least some pixels and on a model (W) of the exponential decay of the remanence; and
   correcting, for each of the at least some pixels of the image ($f_n$), the estimated remanence based on the corresponding remanence measure ($\omega^*_{n,x}$) to obtain an a posteriori estimation ($\mu_{n,x}$).

10. The method of claim 1, further comprising detecting that the sequence of images corresponds to a changing scene prior to removing the remanence artifacts from the image ($f_n$).

11. A non-transitory storage medium storing computer instructions thereon that, when executed by a processor of an image processing device, cause the processor to perform the method of claim 1.

12. An image processing device comprising:
   at least one memory storing an image ($f_n$) of a sequence of images captured by an infrared imaging device and one or more remanence measures ($\omega^*_{n,x}$) of at least one previous image in the sequence; and
   one or more processors configured to remove remanence artifacts from the image ($f_n$) by:
      inpainting a zone of remanence (K) in the image ($f_n$) to generate an inpainted image;
      generating a remanence measure ($\omega^*_{n,x}$) for at least some pixels in the image ($f_n$) based on the inpainted image; and
      removing remanence artifacts from at least some pixels of the image ($f_n$) based on a remanence estimation ($\mu_{n,x}$) for each of the at least some pixels, each remanence estimation ($\mu_{n,x}$) being generated based on the remanence measures ($\omega^*_{n,x}$) of a plurality of the images in the sequence.

13. The image processing device of claim 12, wherein the remanence estimation is a mean remanence estimation ($\mu_{n,x}$) corresponding to an estimation of an instantaneous mean remanence for each of the at least some pixels.

14. An infrared imaging device comprising:
   a microbolometer array (102); and
   the image processing device (112) of claim 12.

15. An infrared camera comprising the infrared imaging device of claim 14.

* * * * *